United States Patent
La et al.

(10) Patent No.: US 11,830,992 B2
(45) Date of Patent: Nov. 28, 2023

(54) METHOD OF REGENERATING LITHIUM PRECURSOR

(71) Applicant: SK Innovation Co., Ltd., Seoul (KR)

(72) Inventors: Yeon Hwa La, Daejeon (KR); Dong Wook Ha, Daejeon (KR)

(73) Assignee: SK Innovation Co., Ltd., Seoul (KR)

( * ) Notice: Subject to any disclaimer, the term of this patent is extended or adjusted under 35 U.S.C. 154(b) by 260 days.

(21) Appl. No.: 16/829,334

(22) Filed: Mar. 25, 2020

(65) Prior Publication Data

US 2020/0313251 A1    Oct. 1, 2020

(30) Foreign Application Priority Data

Mar. 27, 2019    (KR) ........................ 10-2019-0035139

(51) Int. Cl.
     *H01M 10/54*      (2006.01)
     *H01M 10/0525*      (2010.01)
     *H01M 4/04*      (2006.01)
     *H01M 4/505*      (2010.01)
     *H01M 4/525*      (2010.01)

(52) U.S. Cl.
CPC ......... *H01M 10/54* (2013.01); *H01M 4/0454* (2013.01); *H01M 4/505* (2013.01); *H01M 4/525* (2013.01); *H01M 10/0525* (2013.01)

(58) Field of Classification Search
CPC .... H01M 10/54; H01M 4/0454; H01M 4/505; H01M 4/525; H01M 10/0525; H01M 10/052; H01M 4/485; Y02E 60/10; Y02P 10/20; Y02W 30/84; C01G 53/40; C01G 45/02; C01G 51/04; C01G 53/04; C01D 15/08; C22B 7/001; C22B 26/12
See application file for complete search history.

(56) References Cited

U.S. PATENT DOCUMENTS

| | | | |
|---|---|---|---|
| 2008/0050295 A1* | 2/2008 | Uchida | C22B 26/12 423/179.5 |
| 2014/0326918 A1* | 11/2014 | Chen | B01J 8/18 423/594.15 |
| 2021/0028515 A1 | 1/2021 | Na et al. | |

FOREIGN PATENT DOCUMENTS

| | | | | |
|---|---|---|---|---|
| JP | 2010231925 A | 10/2010 | | |
| JP | 20131990 A | 1/2013 | | |
| KR | 20030070469 A | 8/2003 | | |
| KR | 1020150002963 A | 1/2015 | | |
| KR | 1020160138923 A | 12/2016 | | |
| KR | 101731213 B1 | 4/2017 | | |
| KR | 1020170106004 A | 9/2017 | | |
| KR | 101897134 B1 | 9/2018 | | |
| KR | 101911633 B1 * | 10/2018 | ............ | C01D 15/02 |

(Continued)

OTHER PUBLICATIONS

Machine translation of KR 101911633B1, Wang Jei, 2018 (Year: 2018).*

*Primary Examiner* — Kwang Han
(74) *Attorney, Agent, or Firm* — THE WEBB LAW FIRM

(57) ABSTRACT

In a method for regenerating a lithium precursor, a lithium-containing waste mixture is put into a reactor. An inside of the reactor is replaced with carbon dioxide. Temperature raising treatment is performed on the lithium-containing waste mixture and the carbon dioxide to produce lithium carbonate and a transition metal-containing mixture. The lithium precursor may be recovered with high yield and high efficiency through dry treatment using carbon dioxide.

14 Claims, 2 Drawing Sheets

(56) References Cited

FOREIGN PATENT DOCUMENTS

KR 101911633 B1 10/2018
WO 2016190669 A1 12/2016

* cited by examiner

METHOD OF REGENERATING LITHIUM PRECURSOR

CROSS-REFERENCE TO RELATED APPLICATION

This application claims priority to Korean Patent Application No. 10-2019-0035139 filed Mar. 27, 2019, the disclosure of which is hereby incorporated by reference in its entirety.

BACKGROUND OF THE INVENTION

1. Field of the Invention

The present invention relates to a method for regenerating a lithium precursor. More specifically, the present invention relates to a method for regenerating a lithium precursor from a lithium-containing waste mixture.

2. Description of the Related Art

A secondary battery is a battery which can be repeatedly charged and discharged. With rapid progress of information and communication, and display industries, the secondary battery has been widely applied to various portable telecommunication electronic devices such as a camcorder, a mobile phone, a notebook computer as a power source thereof. For example, the secondary battery may include a lithium secondary battery, a nickel-cadmium battery, and a nickel-hydrogen battery. Among them, the lithium secondary battery has a high operating voltage and a high energy density per unit weight, and is advantageous in terms of a charging speed and light weight. In this regard, the lithium secondary battery has been actively developed and applied as a power source.

The lithium secondary battery may include: an electrode assembly including a cathode, an anode, and a separation membrane (separator); and an electrolyte in which the electrode assembly is impregnated. The lithium secondary battery may further include, for example, a pouch-shaped sheath in which the electrode assembly and the electrolyte are housed.

In the lithium secondary battery, a lithium metal oxide may be used as a cathode active material. The lithium metal oxide may further contain transition metals such as nickel, cobalt, and manganese.

The lithium metal oxide as the cathode active material may be prepared by reacting a lithium precursor and a nickel-cobalt-manganese (NCM) precursor containing nickel, cobalt and manganese.

As the above-described expensive valuable metals are used for the cathode active material, 20% or more of the manufacturing costs is spent to manufacture a cathode material. In addition, as environmental protection issues have emerged in recent years, studies on a method for recycling the cathode active material have been conducted. In order to recycle the cathode active material, it is necessary to regenerate the lithium precursor from a waste cathode with high efficiency and high purity.

For example, Korean Patent Laid-Open Publication No. 2015-0002963 discloses a method for recovering lithium from a lithium-containing waste liquid using a wet process such as a solvent extraction process. However, since lithium is recovered from the waste liquid remaining after extracting cobalt, nickel, and the like by wet extraction, a recovery rate thereof is excessively reduced, and a large amount of impurities may be generated from the waste liquid.

SUMMARY OF THE INVENTION

According to an aspect of the present invention, there is provided a method for regenerating a lithium precursor from a lithium-containing waste mixture with high purity, high yield and high efficiency.

A method for regenerating a lithium precursor of exemplary embodiments includes: putting a lithium-containing waste mixture into a reactor; replacing an inside of the reactor with carbon dioxide; and performing temperature raising treatment on the lithium-containing waste mixture and the carbon dioxide to produce lithium carbonate and a transition metal-containing mixture.

In exemplary embodiments, the reactor may have a non-oxidizing atmosphere.

In exemplary embodiments, the temperature raising treatment may be performed at a temperature of 600 to 1000° C.

In exemplary embodiments, the performing temperature raising treatment may include supplying additional carbon dioxide.

In exemplary embodiments, the performing temperature raising treatment may include supplying an inert gas or a reductive material.

In exemplary embodiments, the inert gas may include nitrogen or argon.

In exemplary embodiments, the reductive material may include at least one selected from the group consisting of hydrogen, carbon monoxide and a carbon-based solid material.

In exemplary embodiments, the temperature raising treatment may be performed at a temperature of 500 to 800° C.

In exemplary embodiments, the reactor may include a fluidized bed reactor.

In exemplary embodiments, the lithium-containing waste mixture may include a compound represented by Formula 1 below:

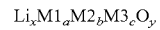
[Formula 1]

In Formula 1, M1, M2 and M3 may independently be selected from the group consisting of Ni, Co, Mn, Na, Mg, Ca, Ti, V, Cr, Cu, Zn, Ge, Sr, Ag, Ba, Zr, Nb, Mo, Al, Ga and B, and $0<x\leq1.1$, $2\leq y\leq2.02$, $0<a<1$, $0<b<1$, $0<c<1$, and $0<a+b+c\leq1$.

In exemplary embodiments, the transition metal-containing mixture may include a transition metal or an oxide thereof.

In exemplary embodiments, 9, wherein the transition metal may include at least one selected from the group consisting of nickel, cobalt and manganese.

In exemplary embodiments, the lithium precursor may consist of lithium carbonate.

In exemplary embodiments, the lithium-containing waste mixture may include a cathode active material mixture obtained from a waste lithium secondary battery.

In exemplary embodiments, the temperature raising treatment may include: a first treatment raising a temperature inside the reactor to 600° C., and then maintaining for 30 to 120 minutes; a second treatment raising the temperature inside the reactor to 700° C. after the first treatment, and then maintaining for 30 to 120 minutes; and a third treatment raising the temperature inside the reactor to 800° C. after the second treatment, and then maintaining for 30 to 120 minutes.

According to exemplary embodiments of the present invention, the lithium precursor may be recovered with high yield and high efficiency through dry treatment using carbon dioxide.

In exemplary embodiments, it is possible to supply an inert gas or a reductive material during dry processing. Therefore, the inert gas and the reductive material may accelerate a reaction of the lithium-containing waste mixture with carbon dioxide.

DETAILED DESCRIPTION OF THE INVENTION

Embodiments of the present invention provide a method for regenerating a reusable lithium precursor for manufacturing a cathode active material from a waste lithium secondary battery.

Hereinafter, the present invention will be described in detail with reference to some embodiments and the accompanying drawings. However, those skilled in the art will appreciate that such embodiments described with reference to the accompanying drawings are provided to further understand the spirit of the present invention and do not limit subject matters to be protected as disclosed in the detailed description and appended claims.

The term "precursor" used herein comprehensively refers to a compound including a specific metal and being able to provide the specific metal to an electrode active material.

Figure 1:
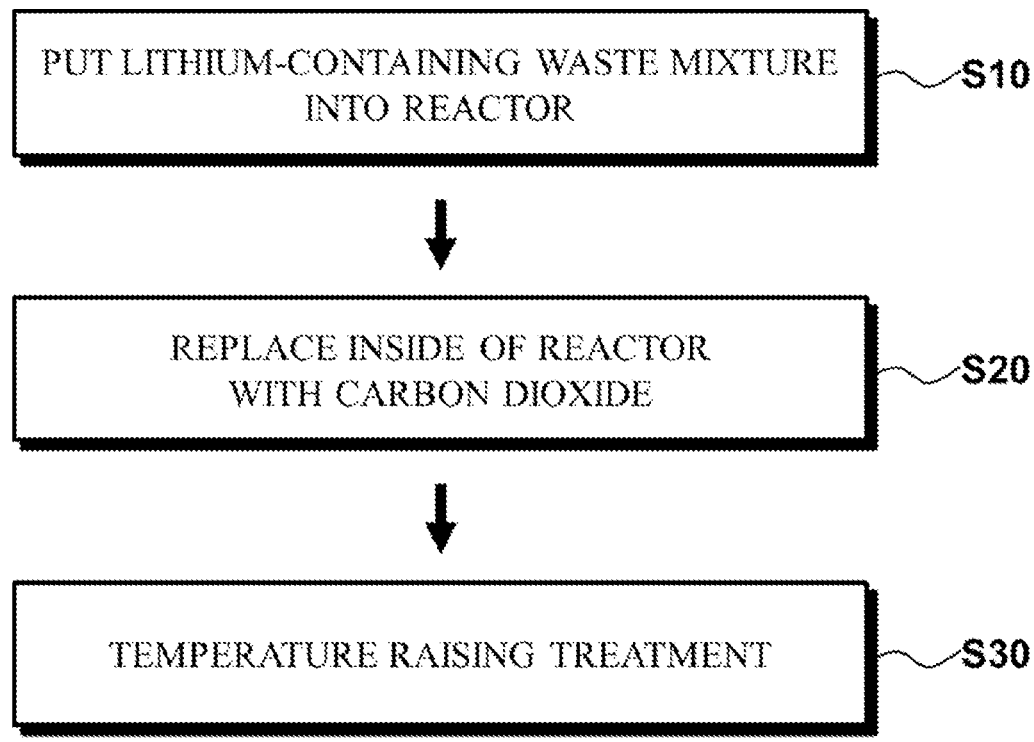
FIG. 1 is a schematic flowchart describing a method for regenerating a lithium precursor according to exemplary embodiments.

FIG. 1 is a schematic flowchart describing a method for regenerating a lithium precursor according to exemplary embodiments.

Referring to FIG. 1, a lithium-containing waste mixture may be prepared. The lithium-containing waste mixture may include a lithium-containing compound obtained or regenerated from electrical devices, or chemical devices. A non-limited example of the lithium-containing waste mixture may include various lithium-containing compounds such as a lithium oxide, lithium carbonate, and lithium hydroxide.

According to exemplary embodiments, the lithium-containing waste mixture may include a cathode active material mixture obtained from the waste lithium secondary battery.

The waste lithium secondary battery may include an electrode assembly including a cathode, an anode, and a separator interposed between the cathode and the anode. The cathode and the anode may include a cathode active material layer and an anode active material layer coated on a cathode current collector and an anode current collector, respectively.

For example, the cathode active material included in the cathode active material layer may include an oxide containing lithium and a transition metal.

In some embodiments, the cathode active material may be a nickel-cobalt-manganese (NCM)-based lithium oxide, which includes nickel, cobalt and manganese. The NCM-based lithium oxide as the cathode active material may be prepared by reacting a lithium precursor and an NCM precursor (e.g., NCM oxide) with each other through a co-precipitation reaction, for example.

However, embodiments of the present invention may be commonly applied to a lithium-containing cathode material, as well as the cathode material including the NCM-based lithium oxide.

Thereby, according to embodiments of the present invention, there may be provided a method for regenerating lithium carbonate as a lithium precursor at a high selectivity.

For example, the cathode may be separated from the waste lithium secondary battery to recover a waste cathode. As described above, the cathode includes the cathode current collector (e.g., aluminum (Al)) and the cathode active material layer, wherein the cathode active material layer may include a conductive additive and a binder together with the above-described cathode active material.

The conductive additive may include, for example, a carbon-based material such as graphite, carbon black, graphene, carbon nanotube and the like. For example, the binder may include a resin material such as vinylidene fluoride-hexafluoropropylene copolymer (PVDF-co-HFP), polyvinylidene fluoride (PVDF), polyacrylonitrile, polymethyl methacrylate and the like.

A cathode active material mixture may be prepared from the recovered cathode. In some embodiments, the cathode active material mixture may be fabricated in a powder form through a physical method such as grinding processing. The cathode active material mixture may include powders of lithium-transition metal oxide as described above, and may include, for example, NCM-based lithium oxide powders (e.g., Li(NCM)O$_2$).

In some embodiments, the recovered cathode may be subjected to heat treatment before the grinding processing. Thereby, detaching of the cathode current collector may be accelerated during the grinding processing, and the binder and the conductive additive may be at least partially removed. The heat treatment may be performed at a temperature, for example, about 100 to 500° C., and preferably about 350 to 450° C.

In some embodiments, the cathode active material mixture may be obtained after immersing the recovered cathode in an organic solvent. For example, the recovered cathode may be immersed in the organic solvent to separate and remove the cathode current collector, and the cathode active material may be selectively extracted through centrifugation.

Through the above-described processes, a cathode current collector component such as aluminum may be substantially completely separated to obtain the cathode active material mixture, from which carbon-based components derived from the conductive additive and the binder are removed or reduced in amount.

In some embodiments, the lithium-containing waste mixture may include a compound represented by Formula 1 below.

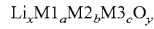   [Formula 1]

In Formula 1, M1, M2 and M3 may be independently selected from the group consisting of Ni, Co, Mn, Na, Mg, Ca, Ti, V, Cr, Cu, Zn, Ge, Sr, Ag, Ba, Zr, Nb, Mo, Al, Ga and B. In Formula 1, x, y, a, b and c are ranges of $0<x\leq1.1$, $2\leq y\leq2.02$, $0<a<1$, $0<b<1$, $0<c<1$, and $0<a+b+c\leq1$.

According to exemplary embodiments, the lithium-containing waste mixture may be put into a reactor (for example, step S10). The reactor may separate the lithium-containing waste mixture inside the reactor from an external system.

In some embodiments, the reactor may include a fluidized bed reactor. For example, the lithium-containing waste mixture may be put into the fluidized bed reactor to be reacted inside the fluidized bed reactor.

For example, a reaction gas may be injected into a lower portion of the fluidized bed reactor to allow the reaction gas to pass from a bottom of the lithium-containing waste mixture. A cyclone is formed by the reaction gas from the bottom of the fluidized bed reactor and contacts with the lithium-containing waste mixture.

For example, the fluidized bed can facilitate a mixture of gas and solid to accelerate the reaction, thereby easily forming a reaction bed of the lithium-containing waste mixture in the fluidized bed reactor. Therefore, reactivity (e.g., reaction opportunity, uniformity, etc.) of the lithium-containing waste mixture and the reaction gas may be increased. The reaction gas may include carbon dioxide.

In exemplary embodiments, an atmosphere inside the reactor may be replaced with carbon dioxide (for example, step S20). Thereby, it is possible to remove an oxidizing gas such as oxygen inside the reactor. For example, the replacement may include purging with carbon dioxide.

In exemplary embodiments, the reactor may have a non-oxidizing atmosphere formed therein. Therefore, it is possible to facilitate a reductive decomposition reaction inside the reactor.

In exemplary embodiments, the atmosphere inside the reactor may be replaced with carbon dioxide before putting the lithium-containing waste mixture. In this case, the step of replacing the atmosphere inside the reactor, into which the lithium-containing waste mixture is injected, with carbon dioxide may be omitted.

In exemplary embodiments, the lithium-containing waste mixture and the carbon dioxide may be subjected to temperature raising treatment (for example, step S30). Due to the temperature raising treatment, lithium carbonate and a transition metal-containing mixture may be produced. For example, the lithium-containing waste mixture may be decomposed by reaction with carbon dioxide to produce lithium carbonate and the transition metal-containing mixture.

For example, the reaction of the lithium-containing waste mixture with carbon dioxide may be represented by Reaction Scheme 1 below.

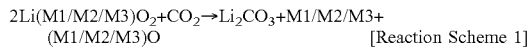
[Reaction Scheme 1]

In Reaction Scheme 1, M1, M2, and M3 may be defined same as the M1, M2, and M3 of Formula 1, respectively. (M1/M2/M3) of Li (M1/M2/M3)O$_2$ may mean that M1, M2 and M3 are present in an appropriate equivalent (moles, for example, total oxidation number of +3).

In exemplary embodiments, the temperature raising treatment may be performed at a temperature of 600 to 1000° C. When performing the temperature raising treatment at a temperature less than 600° C., a reaction between the lithium-containing waste mixture and carbon dioxide may not occur. When performing the temperature raising treatment at a temperature exceeding 1000° C., the lithium-containing waste mixture, the lithium carbonate, the transition metal-containing compound, and/or carbon dioxide may bond with each other to form another by-product other than the lithium carbonate. Therefore, a purity and a yield of the lithium precursor may worsen. Preferably, the temperature raising treatment may be performed at a temperature of 650 to 800° C.

In exemplary embodiments, additional carbon dioxide may be supplied to the reactor during the temperature raising treatment. For example, by additionally supplying the carbon dioxide, carbon dioxide consumed to form the lithium carbonate may be replenished. Therefore, the formation of the lithium carbonate may be accelerated.

In exemplary embodiments, an inert gas or a reductive material may be supplied to the reactor during the temperature raising treatment. The inert gas and/or the reductive material may accelerate the reaction of the lithium-containing waste mixture with carbon dioxide. For example, a reductive decomposition reaction of the lithium-containing waste mixture may be accelerated. The reactivity between the lithium-containing waste mixture and carbon dioxide may be increased, and thus a thermal energy required for the reaction may be decreased.

In some embodiments, the inert gas may include nitrogen (N$_2$), argon (Ar) and the like.

In some embodiments, the reductive material may include a reducing gas such as hydrogen (H$_2$) and carbon monoxide (CO) and a carbon-based solid material. In some embodiments, the carbon-based solid material may include a solid material containing a carbon component. For example, the carbon-based solid material may include graphite, pitch, coke and the like.

In exemplary embodiments, when supplying the inert gas or the reductive material, the temperature raising treatment may be performed at a temperature of 500 to 800° C. Therefore, it is possible to produce a high purity lithium precursor with a less thermal energy.

In some embodiments, the transition metal-containing mixture may include a transition metal or an oxide thereof. For example, the mixture may include Ni, Co, Mn, NiO, CoO, MnO and the like.

In exemplary embodiments, the temperature raising treatment may be performed with a stepwise temperature raising treatment. For example, the stepwise temperature raising treatment may include a first treatment, a second treatment, and a third treatment.

In the first treatment, the temperature inside the reactor may be increased to 600° C., and then may be maintained for 30 to 120 minutes. Preferably, the first treatment may be performed for 60 to 120 minutes.

In the second treatment, the temperature inside the reactor may be increased to 700° C. after the first treatment, and then may be maintained for 30 to 120 minutes. Preferably, the second treatment may be performed for 60 to 120 minutes.

In the third treatment, the temperature inside the reactor may be increased to 800° C. after the second treatment, and then may be maintained for 30 to 120 minutes. Preferably, the third treatment may be performed for 60 to 120 minutes.

If the maintaining time is less than 30 minutes, the reaction between the lithium-containing waste mixture and carbon dioxide may be insufficient. When the maintaining time exceeds 120 minutes, by-products other than the lithium carbonate may be formed.

In exemplary embodiments, the temperature raising treatment may be performed for 3 hours or more. When performing the temperature raising treatment in less than 3 hours, the lithium-containing waste mixture may not be converted into lithium carbonate and the transition metal-containing mixture.

For example, the lithium-containing waste mixture and carbon dioxide may be exposed to a gradually rising temperature condition through the stepwise temperature raising treatment. Thereby, it is possible to prevent the lithium-containing waste mixture from being converted into the by-products other than the lithium carbonate.

In some embodiments, washing processing may be performed after the temperature raising. In this case, the lithium carbonate may be converted into lithium hydroxide, and the transition metal-containing mixture may be precipitated and separated.

In some embodiments, the precipitated and separated transition metal-containing mixture may be treated with an acid solution to form precursors in an acid salt form of each transition metal. In one embodiment, sulfuric acid may be used as the acid solution. In this case, $NiSO_4$, $MnSO_4$ and $CoSO_4$ may be recovered as the transition metal precursors.

As described above, the lithium precursor may be prepared through dry mixing with carbon dioxide at a high temperature. Therefore, it is possible to prevent a generation of waste liquid during wet processing, and to regenerate the lithium precursor with high purity under a non-acidic condition. In addition, it is possible to recover the lithium contained in the waste liquid which is discarded.

Hereinafter, preferred embodiments are proposed to more concretely describe the present invention. However, the following examples are only given for illustrating the present invention and those skilled in the related art will obviously understand that various alterations and modifications are possible within the scope and spirit of the present invention. Such alterations and modifications are duly included in the appended claims.

Experimental Example: Regeneration of Lithium-Containing Waste Mixture Using $CO_2$ 0.3 g of cathode active material of Li(NCM)O2 was put into a reactor, and an atmosphere inside the reactor was replaced with carbon dioxide gas (99.9999%).

The reaction was carried out at 500° C., 600° C., 700° C., 800° C. and 900° C. for 1 hour, respectively, while raising the temperature inside the reactor. The reaction was carried out while supplying additional carbon dioxide gas (99.9999% purity) at a flow rate of 100 ccm.

Figure 2:
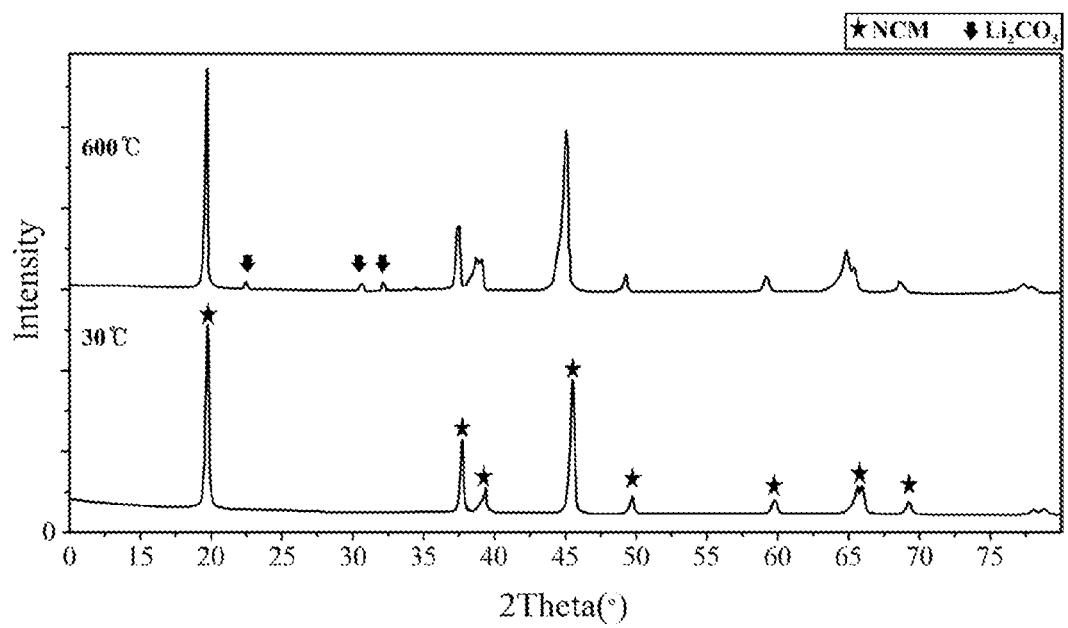
FIGS. 2 and 3 are X-ray diffraction (XRD) analysis graphs for confirming a regeneration of the lithium precursor according to exemplary embodiments of the present invention, respectively.
Figure 3:
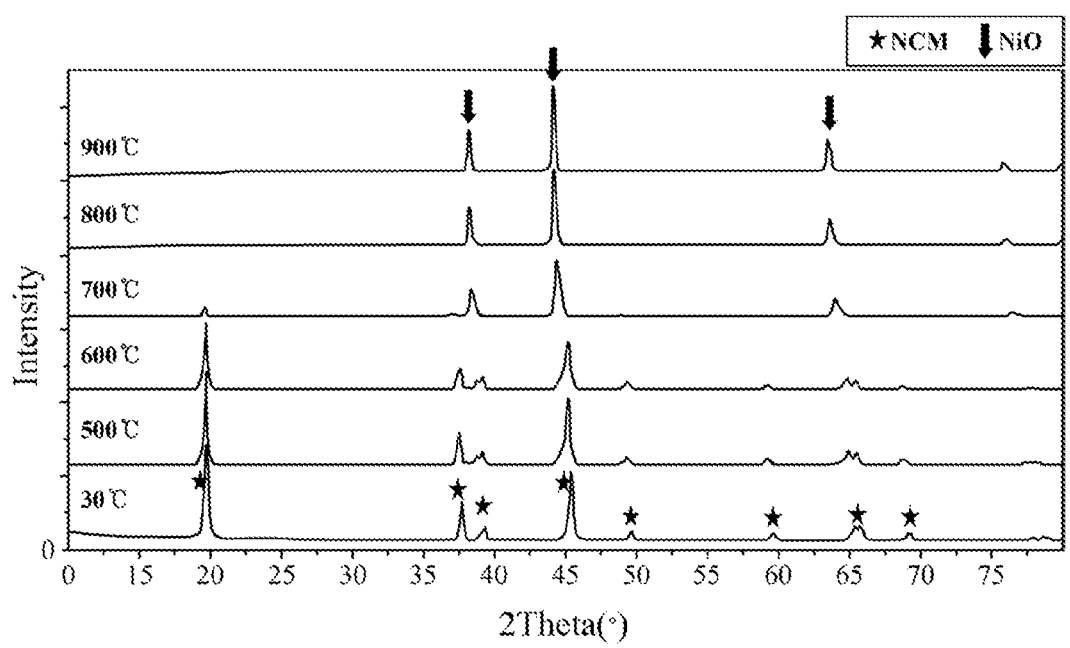

X-ray diffractometer (XRD) Empyrean (PANalytical Com.) analysis was performed whenever each of the reaction for 1 hour is completed, to obtain graphs shown in FIGS. 2 and 3. Asterisks in FIG. 2 indicate crystal peaks of $Li(NCM)O_2$, and arrows indicate crystal peaks of lithium carbonate. Asterisk in FIG. 3 indicate crystal peaks of $Li(NCM)O_2$, and arrows indicate crystal peaks of NiO.

Referring to FIGS. 2 and 3, it can be confirmed that $Li(NCM)O_2$ is decomposed at 600° C. to produce $Li_2CO_3$. In addition, it could be confirmed that $Li(NCM)O_2$ was substantially completely decomposed to be converted into (Ni/Co/Mn)O at 800° C.

What is claimed is:

1. A method for regenerating a lithium precursor comprising:
putting a lithium-containing waste mixture into a reactor;
supplying carbon dioxide to a lower portion of the reactor so that an atmosphere inside the reactor is replaced with carbon dioxide while oxygen inside the reactor is removed; and
performing a temperature raising treatment on the lithium-containing waste mixture and on the carbon dioxide after the atmosphere inside the reactor is replaced with carbon dioxide and while oxygen inside the reactor is removed to produce lithium carbonate and a transition metal-containing mixture,
wherein the temperature raising treatment is not performed in the supplying of carbon dioxide.

2. The method for regenerating a lithium precursor according to claim 1, wherein the temperature raising treatment is performed at a temperature of 600 to 1000° C.

3. The method for regenerating a lithium precursor according to claim 1, wherein the performing temperature raising treatment comprises supplying additional carbon dioxide.

4. The method for regenerating a lithium precursor according to claim 1, wherein the performing temperature raising treatment comprises supplying an inert gas or a reductive material.

5. The method for regenerating a lithium precursor according to claim 4, wherein the inert gas comprises nitrogen or argon.

6. The method for regenerating a lithium precursor according to claim 4, wherein the reductive material comprises at least one selected from the group consisting of hydrogen, carbon monoxide and a carbon-based solid material.

7. The method for regenerating a lithium precursor according to claim 4, wherein the temperature raising treatment is performed at a temperature of 500 to 800° C.

8. The method for regenerating a lithium precursor according to claim 1, wherein the reactor comprises a fluidized bed reactor.

9. The method for regenerating a lithium precursor according to claim 1, wherein the lithium-containing waste mixture comprises a compound represented by Formula 1 below:

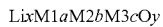

$$Li_xM1_aM2_bM3_cO_y \quad \text{[Formula 1]}$$

In Formula 1, M1, M2 and M3 are independently selected from the group consisting of Ni, Co, Mn, Na, Mg, Ca, Ti, V, Cr, Cu, Zn, Ge, Sr, Ag, Ba, Zr, Nb, Mo, Al, Ga and B, and $0<x\leq1.1$, $2\leq y\leq2.02$, $0<a<1$, $0<b<1$, $0<c<1$, and $0<a+b+c\leq1$.

10. The method for regenerating a lithium precursor according to claim 1, wherein the transition metal-containing mixture comprises a transition metal or an oxide thereof.

11. The method for regenerating a lithium precursor according to claim 8, wherein the transition metal comprises at least one selected from the group consisting of nickel, cobalt and manganese.

12. The method for regenerating a lithium precursor according to claim 1, wherein the lithium precursor consists of lithium carbonate.

13. The method for regenerating a lithium precursor according to claim 1, wherein the lithium-containing waste mixture comprises a cathode active material mixture obtained from a waste lithium secondary battery.

14. The method for regenerating a lithium precursor according to claim 1, wherein the temperature raising treatment comprises:
a first treatment raising a temperature inside the reactor to 600° C., and then maintaining for 30 to 120 minutes;
a second treatment raising the temperature inside the reactor to 700° C. after the first treatment, and then maintaining for 30 to 120 minutes; and
a third treatment raising the temperature inside the reactor to 800° C. after the second treatment, and then maintaining for 30 to 120 minutes.

* * * * *